United States Patent
Austin

(10) Patent No.: US 9,443,081 B2
(45) Date of Patent: Sep. 13, 2016

(54) METHOD AND APPARATUS FOR CONTROLLING ACCESS TO A RESOURCE IN A COMPUTER DEVICE

(71) Applicant: Mark James Austin, Manchester (GB)

(72) Inventor: Mark James Austin, Manchester (GB)

(73) Assignee: Avecto Limited, Manchester (GB)

( * ) Notice: Subject to any disclaimer, the term of this patent is extended or adjusted under 35 U.S.C. 154(b) by 94 days.

(21) Appl. No.: 13/630,667

(22) Filed: Sep. 28, 2012

(65) Prior Publication Data

US 2013/0086696 A1 Apr. 4, 2013

(30) Foreign Application Priority Data

Sep. 30, 2011 (GB) .................................. 1116838.2

(51) Int. Cl.
*G06F 21/22* (2006.01)
*G06F 21/54* (2013.01)
*G06F 21/33* (2013.01)

(52) U.S. Cl.
CPC ............. *G06F 21/54* (2013.01); *G06F 21/335* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 5,497,463 A * | 3/1996 | Stein | ....................... | G06F 9/547 703/20 |
| 5,802,590 A | 9/1998 | Draves | | |
| 7,698,713 B2 * | 4/2010 | Erlingsson | ............. | G06F 9/4426 709/224 |
| 7,734,914 B1 | 6/2010 | Malasky | | |
| 2003/0160709 A1 * | 8/2003 | Westlund | ............... | B64D 47/08 340/958 |
| 2004/0006706 A1 | 1/2004 | Erlingsson | | |
| 2006/0075462 A1 | 4/2006 | Golan et al. | | |
| 2008/0095370 A1 * | 4/2008 | Rose | ..................... | H04L 9/0662 380/278 |
| 2009/0126006 A1 | 5/2009 | Zhang et al. | | |
| 2009/0165081 A1 | 6/2009 | Zhang et al. | | |
| 2010/0017655 A1 * | 1/2010 | Gooding | ............. | G06F 11/1482 714/16 |
| 2010/0100929 A1 | 4/2010 | Bae et al. | | |
| 2010/0256994 A1 * | 10/2010 | Eisenberger | ........... | G06Q 10/10 705/3 |
| 2010/0262977 A1 | 10/2010 | Havemose | | |
| 2011/0153969 A1 * | 6/2011 | Petrick | ................... | G06F 21/606 711/163 |

(Continued)

FOREIGN PATENT DOCUMENTS

| | | |
|---|---|---|
| EP | 2194456 A1 | 6/2010 |
| WO | 2010025377 A1 | 3/2010 |
| WO | WO 2010025377 A1 * | 3/2010 ............. G06F 21/53 |

OTHER PUBLICATIONS

International Search Report, International app. No. PCT/GB2012/052394. Date of mailing: Jan. 7, 2013. European Patent Office, Rijswijk, Netherlands.

*Primary Examiner* — Dede Zecher
*Assistant Examiner* — Richard McCoy
(74) *Attorney, Agent, or Firm* — Coats & Bennett, PLLC

(57) ABSTRACT

A computer device and method are described for controlling access to a resource. An execution environment executes a user process with access privileges according to a user security context. A security unit controls access to resources according to the user security context, with the user process making system calls to the security unit. A proxy hook module embedded within the user process intercepts the system call and generates a proxy resource access request. A proxy service module in a privileged security context validates the proxy resource access request from the proxy hook module and, if validated, obtains and returns a resource handle that permits access to the desired resource by the user process.

20 Claims, 5 Drawing Sheets

(56) References Cited

U.S. PATENT DOCUMENTS

| | | | |
|---|---|---|---|
| 2011/0283095 A1* | 11/2011 | Hall | G06F 9/3009 712/228 |
| 2012/0278883 A1* | 11/2012 | Gayman | G06F 21/57 726/19 |
| 2013/0117864 A1* | 5/2013 | Jang | G06F 21/34 726/30 |
| 2013/0145139 A1* | 6/2013 | Adam | G06F 21/40 713/2 |
| 2014/0032910 A1* | 1/2014 | Nagai | H04L 9/0844 713/171 |

* cited by examiner

METHOD AND APPARATUS FOR CONTROLLING ACCESS TO A RESOURCE IN A COMPUTER DEVICE

CROSS-REFERENCE TO RELATED APPLICATIONS

This application claims priority from foreign application GB1116838.2 entitled "METHOD AND APPARATUS FOR CONTROLLING ACCESS TO A RESOURCE IN A COMPUTER DEVICE," which was filed in the United Kingdom on Sep. 30, 2011, and which is hereby incorporated by reference in its entirety.

FIELD OF THE INVENTION

The present invention relates generally to the field of computers and computer devices. More particularly, the present invention relates to a method and apparatus for controlling access to a resource in a computer device by providing an improved resource access mechanism.

BACKGROUND

A computer device executes a process using a plurality of physical and logical resources, such as system services, drivers, files and registry settings. Many operating systems include a security module that enforces access rights for each process, whereby the process is permitted (or denied) access to each of the resources, consistent with a set of security privileges allocated to that process. For example, a process of an ordinary user level is able to read from a particular file, but is not permitted to write to that file. Meanwhile, a process of a local administrator level typically has a higher privilege, e.g. is able to both read from and write to that file.

In many operating systems, the security model applies the access privileges based on the user's account. The operating system may define privilege levels appropriate to different classes, or groups, of users, and then apply the privileges of the relevant class or group to the particular logged-in user (e.g., ordinary user, super-user, local administrator, system administrator and so on). The user is authenticated by logging in to the computer device, and the user, via their previously prepared security account, acts as a security principal in the security model. The operating system then grants appropriate privileges to processes which execute in that user's security context.

It is desirable to implement a least-privilege access model, whereby each user is granted the minimal set of access privileges which is just sufficient for the user's desired processes to operate on the computer device. However, in practice, many application programs require a relatively high privilege level, such as the local administrator level, in order to install and operate correctly. Hence, there is a widespread tendency to grant additional privilege rights, such as the local administrator level, and thus user processes gain greater access to the resources of the computer device than is desirable or appropriate from a security viewpoint. For example, these additional privilege rights may then enable accidental tampering with key resources of the computer device, leading to errors or corruption within the device. Further, a particular user process (e.g. an infection or malware) may maliciously access key resources of the computer device with the deliberate intention of subverting security or causing damage.

Therefore, there is a need to provide a mechanism which allows the least-privilege principle to be implemented while still enabling the desired, legitimate, processes to execute on the computer device by accessing the relevant resources. In particular, there is a need to enable higher-level access rights, such as local administrator rights, but without compromising security of the computer device.

The example embodiments have been provided with a view to addressing at least some of the difficulties that are encountered in current computer devices, whether those difficulties have been specifically mentioned above or will otherwise be appreciated from the discussion herein.

SUMMARY

According to the present invention there is provided a computer device, a method and a computer-readable storage medium as set forth in the appended claims. Other, optional, features of the invention will be apparent from the dependent claims, and the description which follows.

At least some of the following example embodiments provide an improved mechanism for controlling access to a resource in a computer device. There now follows a summary of various aspects and advantages according to embodiments of the invention. This summary is provided as an introduction to assist those skilled in the art to more rapidly assimilate the detailed discussion herein and does not and is not intended in any way to limit the scope of the claims that are appended hereto.

In one aspect there is provided a computer device which includes an execution environment for a user process and a security unit which selectively controls access to a plurality of resources. A proxy resource access unit includes a proxy hook module embedded within the user process, and a proxy service module executing in another security context. The proxy hook intercepts system calls by the user process requesting access to a desired resource and, in response, generates a proxy resource access request. The proxy service module selectively validates the request and, if valid, obtains a resource handle from the security unit that permits access to the desired resource. The resource handle is returned to the user process via the proxy hook module thereby permitting subsequent access by the user process to the desired resource. In one embodiment, the proxy service module is arranged to operate the desired resource on behalf of the user process.

In one aspect, a computer device is provided which includes an execution environment arranged to execute a user process according to a user security context which defines access privileges of the user process; a security unit arranged to selectively control access by the user process to a plurality of resources available in the execution environment according to the user security context, wherein the user process is arranged to request access to a desired resource of the plurality of resources by making a system call to the security unit; and a proxy resource access unit comprising: a proxy hook module embedded within the user process, wherein the proxy hook module is arranged to intercept the system call made by the user process to request access to the desired resource and to generate and send a proxy resource access request in response thereto; and a proxy service module arranged to execute in a privileged security context different from the user security context of the user process, wherein the proxy service module is arranged to receive and validate the proxy resource access request from the proxy hook module and, if validated, to obtain from the security unit a resource handle that permits access to the desired resource and to return the resource handle to the user process via the proxy hook module thereby permitting access by the user process to the desired resource.

In one example, the proxy resource access unit is arranged to selectively control access by the user process to the resources as exceptions to the access control by the security unit.

In one example, the proxy resource access unit is arranged to selectively enable access by the user process to the desired resource whereas access to the desired resource otherwise would not be permitted by the security unit, and/or the proxy resource access unit is arranged to selectively deny access by the user process to the desired resource whereas access to the desired resource otherwise would be permitted by the security unit.

In one example, the proxy resource access unit is arranged to validate the proxy resource access request against a policy list comprising a plurality of predetermined policies which define access to the resources by the user process. In one example, the user process is arranged to declare a desired access level in the system call. The access levels may depend on the nature or type of the desired resource. In one example, the desired access levels include create, read and/or write access with respect to the desired resource. In one example, the proxy hook module is arranged to record the desired access level in the proxy resource access request. In one example, the proxy service module is arranged to allow, or deny, access to the desired resource by comparing the desired access level against one or more access levels recorded in the predetermined policies of the policy list. In one example, the proxy resource access request comprises an identity of the user process and the proxy service module allows, or respectively denies, access to the desired resource by comparing the identity of the user process against one or more user process identities recorded in the predetermined policies. In one example, the policy list records whether a requested form of access is to be permitted or denied.

In one example, the proxy service module is arranged to obtain the resource handle which permits access to the desired resource. In one example, the proxy service module is arranged to duplicate the resource handle into a context of the user process as a duplicate handle to be used by the user process to access the desired resource.

In one example, the proxy service module is arranged to return an error code to the proxy hook module. In one example, the proxy service module is arranged to return an error code to the proxy hook module where the proxy resource access request is not permitted. In one example, the proxy hook module is arranged to pass the system call from the user process to the security unit to be processed according to the user security context.

In one example, the proxy hook module is further arranged to intercept system calls made by the user process to operate the desired resource. In one example, the proxy service module is arranged to operate the desired resource on behalf of the user process.

In one example, the proxy hook module is arranged to maintain a record of a system resource handle that has been opened by the proxy service module on its behalf with respect to a desired resource. In one example, the desired resource is provided as a system service. In one example, the proxy hook module is arranged to selectively intercept system calls made by the user process to request an operation of the desired resource. In one example, the proxy service module is arranged to perform the requested operation on behalf of the proxy hook module. In one example, the proxy service module is arranged to return a result of performing the requested operation in a return message.

In one example, the proxy hook module is provided as a dynamic linked library component which hooks into the user process when the user process is started. In one example, the user process is arranged to make the system call though an application programming interface.

In one aspect there is provided a method of controlling access to a resource in a computer device. The method includes executing a user process in an execution environment of the computer device according to a user security context which defines access privileges of the user process; controlling access by the user process to a plurality of resources available in the execution environment according to the user security context by a security unit of the computer device, wherein the user process is arranged to request access to a desired resource of the plurality of resources by making a system call to the security unit; intercepting the system call made by the user process to request access to the desired resource by a proxy hook module embedded within the user process; generating a proxy resource access request by the proxy hook module in response to intercepting the system call and sending the proxy resource access request to a proxy service module executing in a privileged security context different from the user security context of the user process; validating the proxy resource access request by the proxy service module and, if validated, obtaining from the security unit a resource handle that permits access to the desired resource; and returning the resource handle from the proxy service module to user process via the proxy hook module thereby permitting access by the user process to the desired resource.

In one aspect, a computer-readable storage medium is provided having recorded thereon instructions which, when implemented by a computer device, cause the computer device to be arranged as set forth herein and/or which cause the computer device to perform the method as set forth herein.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

For a better understanding of the invention, and to show how example embodiments may be carried into effect, reference will now be made to the accompanying drawings in which.

DETAILED DESCRIPTION

The example embodiments of the present invention will be discussed in detail in relation to Microsoft™ Windows™ operating systems. However, the teachings, principles and techniques of the present invention are also applicable in other example embodiments. For example, the example embodiments are also applicable to other operating systems, in particular those having a discretionary access control security model.

Figure 1:
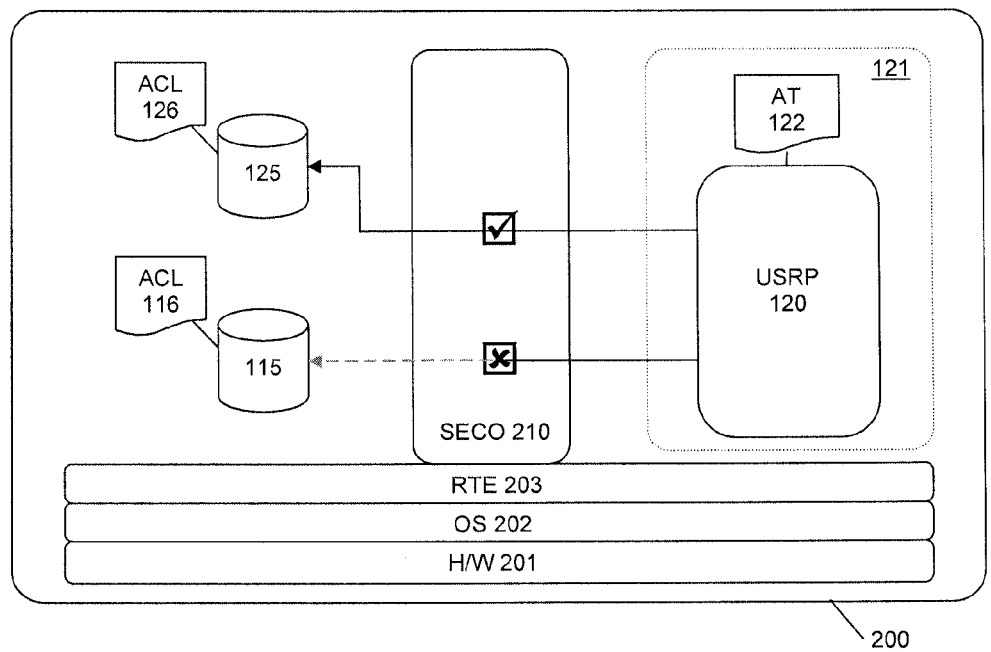
FIG. 1 is a schematic overview of an example computer device in which the example embodiments may be applied.

FIG. 1 is a schematic overview of a computer device 200 according to an example embodiment of the present invention. In this example, the host computer device 200 includes physical hardware (HW) 201 such as memory, processors, I/O interfaces, backbone, power supply and so on as are found in, for example, a typical server computer. An operating system (OS) 202 provides a multitude of components, modules and units that coordinate to provide a runtime environment (RTE) 203 which supports execution of a plurality of processes. Here, the processes may include a one or more user processes (USRP) 120. The user processes 120 may relate to one or more application programs which the user desires to execute on the computer device 200.

The computer device 200 includes a plurality of resources 115, 125. These resources 115, 125 are the components of the computer device that the processes 120 will rely upon in order to carry out their execution. For example, the resources 115, 125 may include installed software, system services, drivers, files and/or registry settings.

As shown in FIG. 1, the operating system 202 includes a security module (SECO) 210 which is provided to enforce security within the computer device 200. As one example, the security module 210 is provided by the Windows™ operating system as supplied by Microsoft Corp of Redmond, Wash., USA, under the trade marks Windows NT, Windows 2000, Windows XP, Windows Vista, Windows Server 2003, Windows Server 2008, and Windows 7, amongst others. The security module 210, also termed a security sub-system or security manager, suitably enacts the Windows security model as described, for example, in "Windows Security Overview" published 10 Jun. 2011 by Microsoft Corporation, which is incorporated herein by reference in its entirety.

Each process 120 that a user initiates will be run in a security context 121 that derives access rights and permissions from the user's account. To this end, each process 120 is provided with an access token (AT) 122. The access token 122 typically carries the security identity (SID) of the user and SIDs of any other security groups to which the user belongs. The access token 122 thus defines the privileges as held on this host computer 200 by the user and the relevant security groups.

In the example embodiment, the security module 210 is arranged to perform an access check when a user process 120 requests access to any of the resource 115, 125. The security module 210 performs the access check by comparing the access token 122 of the process 120 against a security descriptor, such as an access control list (ACL) 116, 126, associated with the relevant resource 115, 125. Here, the access control list 116, 126 is suitably a Discretionary Access Control List (DACL) which identifies SIDs of users and groups that are allowed, or denied, various types of access (read, write, etc.) as appropriate for that resource.

In FIG. 1, the security module (SECO) 210 in the operating system 202 is sufficient to prevent the user process 120 from tampering with certain key resources 115 while allowing the user process 120 to access appropriate user resources 125, according to the respective access control list 116, 126. For example, the user process 120 is able to read from, but not write to, a file of the key resources 115. Typically, the defined access types will depend upon the type of resource being accessed. For example, storage is typically defined by read and write access rights, while a process may have terminate access rights which determine whether or not a request to terminate that process will be actioned by the operating system 202. As noted above, a user-level security context 121 is based on the user as the security principal and the access token 122 is set accordingly. Suitably, in a system which adopts the least-privilege access model, the user-level security context 121 is deliberately restricted to a minimal set of access rights.

Figure 2:
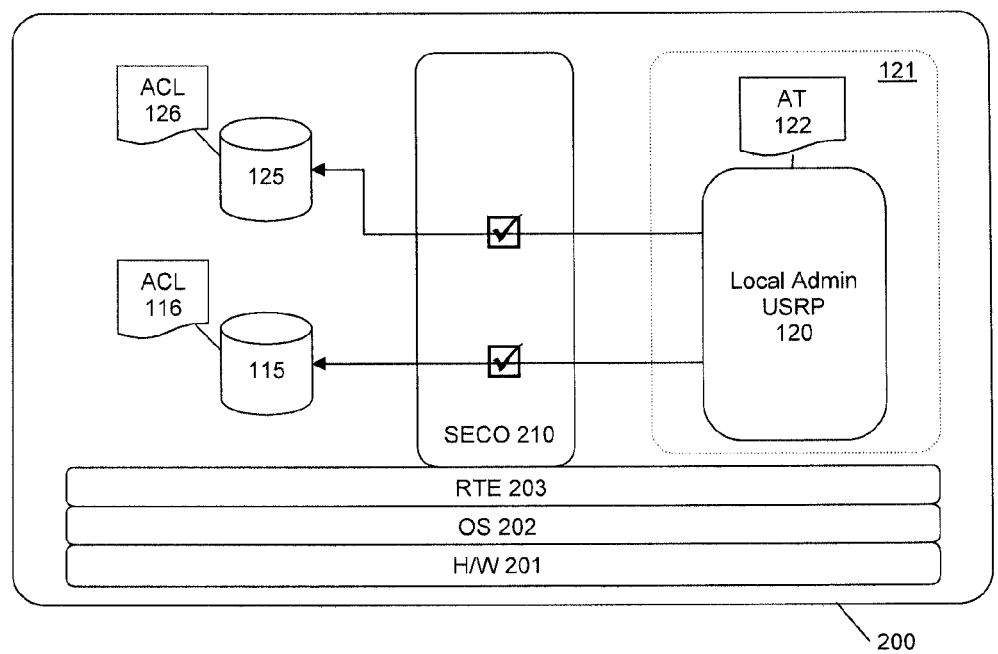
FIG. 2 is a schematic diagram showing the example computer device in more detail concerning access to resources by a process.

FIG. 2 is a schematic diagram showing the example computer device in more detail. In this example, the user process is able to access both the permitted user resources 125 and also the key resources 115. In this example, the key resources 115 are any resources of the computer device where it is desired to protect those resources against access by the user processes 120.

In practice, it is common for a user to be included in a security group, such as the local administrator security group, so that application programs desired by the user will install and operate correctly without needing additional support from a higher-authorized user (such as IT administrator personnel). Where a user is included in such a privileged security group, all of the user process 120 initiated by that user will then be granted the higher-level privilege rights, such as local administrator rights, indiscriminately. Thus, granting local administrator rights, or similar higher privileges, generally allows all user processes 120 to access many of the key resources 115 of the computer system in an indiscriminate manner.

Figure 3:
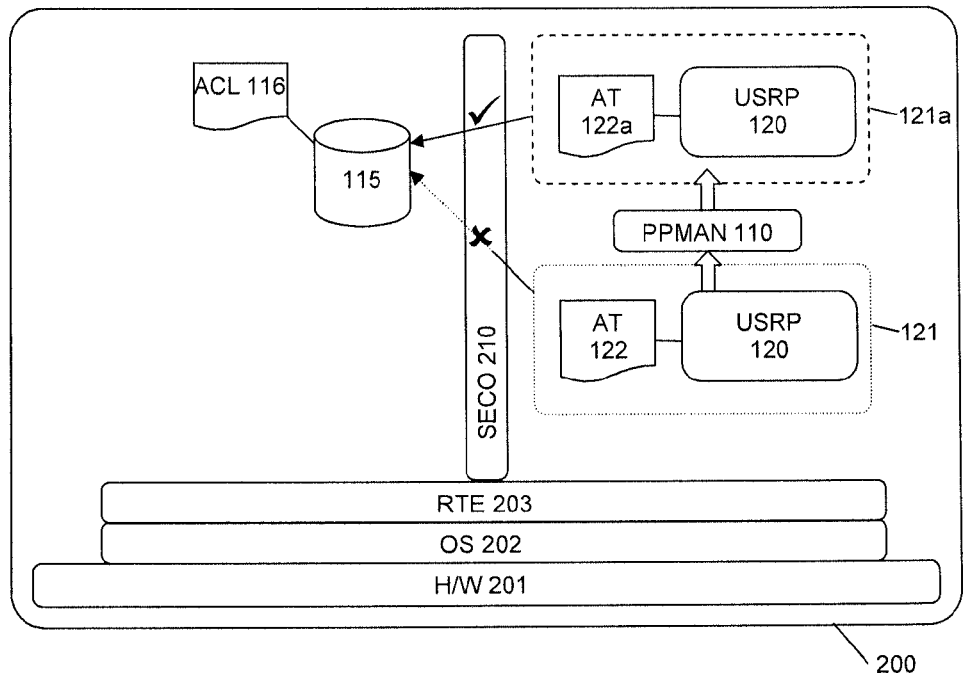
FIG. 3 is a schematic diagram showing the example computer device in more detail concerning a process privilege management mechanism.

FIG. 3 is a schematic diagram showing the example computer device in more detail. In this example, the computer device includes a privilege management module (PP-MAN) 110. This module 110 is arranged to perform dynamic process privilege reassignment, whereby the user process 120 is examined and selectively provided with an adjusted set of privileges. Typically, the privileges of the user process 120 are elevated above an initial level. However, it is also possible to selectively degrade the privilege level of a particular user process using the same adjustment mechanism.

As shown in FIG. 3, the user process 120 is granted a privileged user security context 121a by the privilege management module 110. This can be considered as a dynamic elevation of the privilege level of the user process 120, so that the specific user process 120 is able to achieve a desired, legitimate function which requires greater access rights than were available initially. The process 120 is to be elevated is provided with a new access token 122a, which is created based on the initial access token 122 of that process. As one example, the SID of the local administrator group is added to this new access token 122a, and consequently the process 120 now obtains the privileges and integrity level of the local administrator. The user process 120 is then assigned the new access token 122a, such as by stopping and restarting the process, and thus the privileged user security context 121a is now applied to that user process 120.

As noted above, there is a potentially undesirable side-effect of this privilege management mechanism, because the user process 120 is now provided in a privileged user security context 121a having an access token 122a denoting access rights capable of accessing the key resources 115. In this situation, the security module 210 of the operating system 202 is now incapable of denying access by the user process 120 to all of the plurality of key resources 115. In other words, even assigning security privileges per individual user process 120 still does not discriminate between individual key resources 115. As one example, it is desired that a local administrator should be able to access all of the key resources 115 legitimately, whereas a user process 120, even when dynamically elevated to the local administrator level, should not have those same access privileges with respect to all of the key resources 115.

Figure 4:
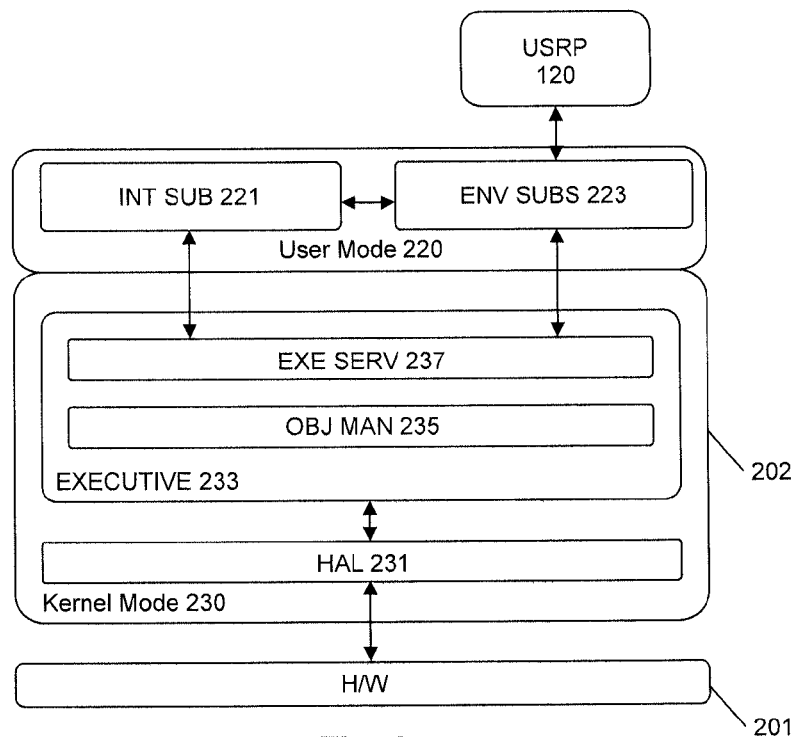
FIG. 4 is a schematic diagram showing the example computer device in more detail concerning the operating system.

FIG. 4 is a schematic diagram showing the example computer device 200 in more detail.

In particular, FIG. 4 shows internal components within the operating system OS 202 in more detail. In the example embodiment, the operating system 202 is based on Windows NT and includes two main components, namely the user mode 220 and the kernel mode 230. The user mode 220 includes integral subsystems (INT SUB) 221 such as workstation service, server service and the security module 210 as discussed above. The user mode 220 also includes environment subsystems (ENV SUB) 223 such as a Win32 environment subsystem, a POSIX environment subsystem and an OS/2® environment subsystem to support user programs, including the user processes 120 as discussed above. These programs and subsystems in the user mode 220 have limited access to system resources. Meanwhile, the kernel mode 230 has unrestricted access to the computer device, including system memory and external devices, etc. The kernel mode 230 includes a hardware abstraction layer (HAL) 231 which interfaces with the physical hardware H/W 201, and a plurality of services, which together are termed the Executive 233. The Executive 233 may include an Object Manager (OBJ MAN) 235 and other services (EXE SERV) 237.

The object manager 235 is an executive subsystem which controls access to objects. The object manager 235 considers each of the resources 115, 125 as an object, including both physical resources such as storage device or peripheral devices and a logical resource such as files or containers. All other executive subsystems, including particularly system calls, pass through the object manager 235 in order to gain access to the resources 115, 125. In operation, the object manager 235 creates and inserts new objects, which makes the object accessible through a handle. Generally speaking, the handle is a unique numerical identifier which identifies that object (resource) to the object manager 235. Each object created by the object manager 235 is stored in an object table, and each entry in the object table may include the object name, security attributes, a pointer to its object type, and other parameters. Typically, the operating system 202 is configured so that every request to access a resource passes through the object manager 235. If the resource 115, 125 is requested by name, then the request is subject to security checks by the security module 210 as discussed above. However, a request to access a resource through an existing, open object handle will generally be allowed without further security checks, provided that the requested access does not exceed the level of access requested when the object was opened or created.

As shown in FIG. 4, the computer 200 provides a security unit which in the example embodiments includes the security module 210 and the object manager 235. The security module 210 is arranged to control access to the resources 115, 125 when access to the resource is requested by a user process, according to the security context of that process. Meanwhile, the object manager 235 may directly permit access to the resources 115, 125 upon the condition that access to the desired resource is subsequently requested using a valid resource handle as issued previously by the object manager 235.

Figure 5:
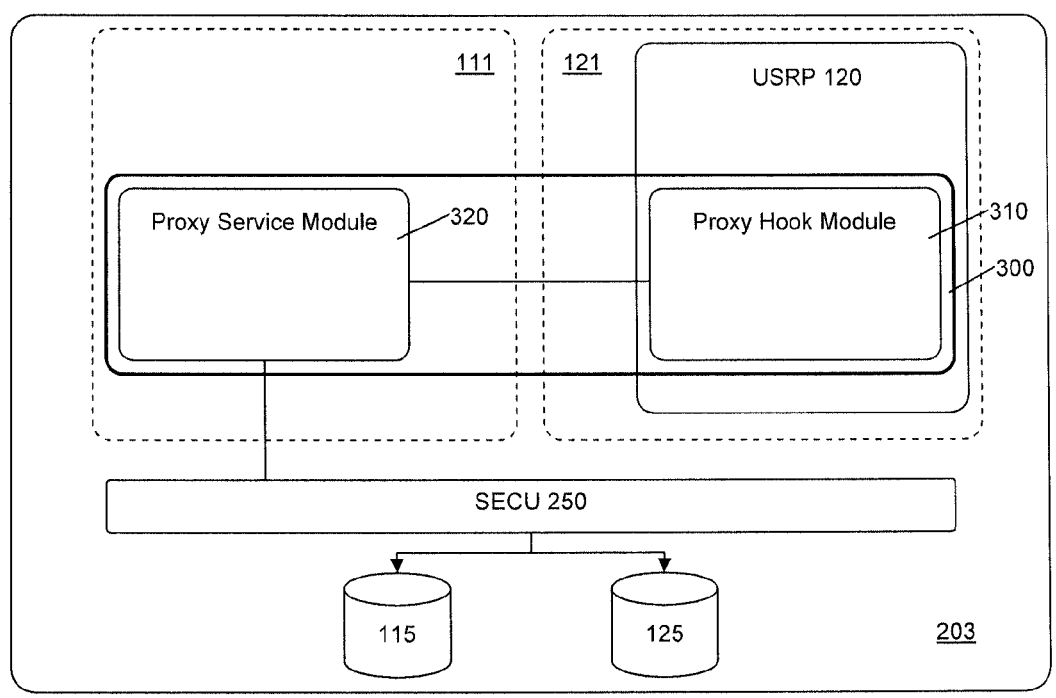
FIG. 5 is a schematic diagram showing the example computer device in more detail concerning a resource access management mechanism.

FIG. 5 is a schematic diagram showing the example computer device in more detail concerning an example embodiment of a proxy resource access mechanism. As shown in FIG. 5, the example embodiment provides a proxy resource access unit 300 comprising a proxy hook module 310 and a proxy service module 320.

As shown in FIG. 5, the example computer device 200 provides the execution environment 203 to execute the user process 120 according to the user security context 121. As noted above, the user security context 121 ordinarily defines the access privileges of the user process 120 with respect to the plurality of resources 115, 125 that are available in the execution environment 203. A security unit 250 is arranged to selectively permit, or deny, access by the user process 120 to the plurality of resources 115, 125. In this example, the security unit 250 includes the security module 210 and the object manager 235 as discussed above.

Figure 6:
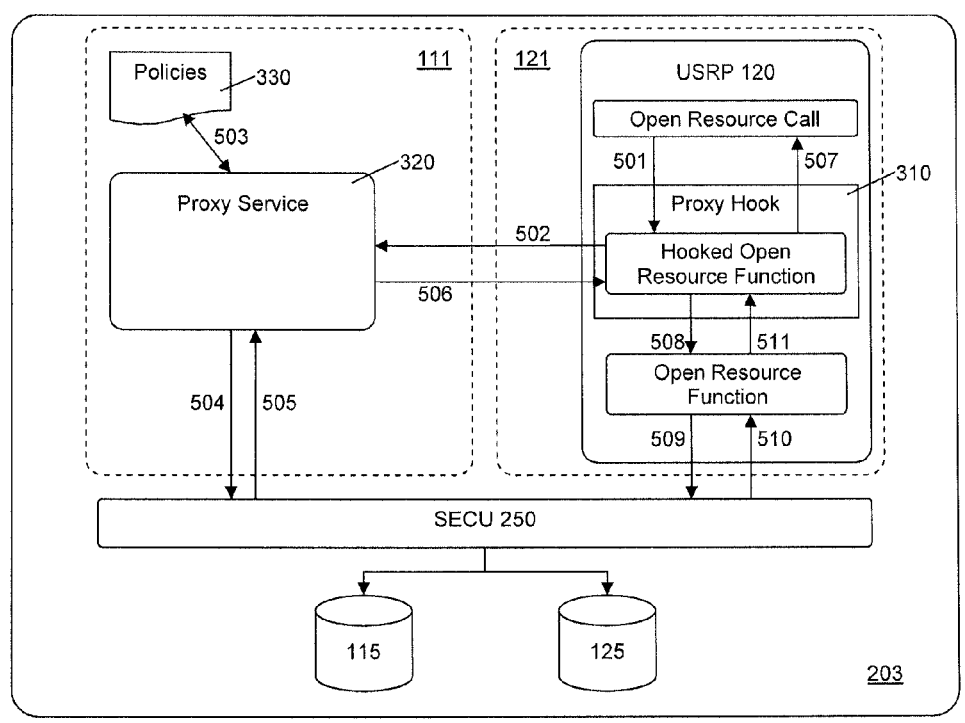
FIG. 6 is a schematic diagram showing the example computer device in more detail concerning a resource access management mechanism and a method of accessing resources in the computer device.

FIG. 6 is a schematic diagram showing the example computer device in more detail concerning the example proxy resource access unit. In particular, FIG. 6 shows a flow of control to proxy access to privileged resources and a respective method of accessing resources in the computer device.

In operation, the user process 120 makes a system call toward the security unit 250 to request access to a desired resource 115 amongst the plurality of available resources 115, 125 within the execution environment 203. In FIG. 6, the system call is represented by the arrow at step 501.

In the example embodiment, a proxy hook 310 is embedded within the user process 120. In one example, the proxy hook 310 is a DLL (dynamic linked library) component that will hook into each user process. The proxy hook 310 suitably hooks into the user process 120 as that process is started within the execution environment 203. In the example embodiment, the proxy hook 310 is arranged to intercept all relevant system calls that open resources. In the Windows operating system, the Windows API (application programming interface) provides a plurality of system calls as shown in Table 1. These are examples of the system calls that may be made by the user process 120 in order to request access to the relevant resources 115, 125.

TABLE 1

| Resource | Win32 API Calls | Native API Calls |
| --- | --- | --- |
| File | CreateFile | ZwCreateFile |
|  | OpenFile | ZwOpenFile |
| Registry Key | RegCreateKeyEx | ZwCreateKey |
|  | RegOpenKeyEx | ZwOpenKey |
| Process | OpenProcess | ZwOpenProcess |
| Event | CreateEvent | ZwCreateEvent |
|  | CreateEventEx | ZwOpenEvent |
|  | OpenEvent |  |
| Mutex | CreateMutex | ZwCreateMutat |
|  | CreateMutexEx | ZwOpenMutant |
|  | OpenMutex |  |

TABLE 1-continued

| Resource | Win32 API Calls | Native API Calls |
|---|---|---|
| Semaphore | CreateSempahore<br>CreateSemapthoreEx<br>OpenSemaphore | ZwCreateSemaphore<br>ZwOpenSemaphore |
| Communications Device | CreateFile | ZwCreateFile |
| File Mapping | CreateFileMapping | ZwCreateSection<br>ZwOpenSection |
| Job | CreateJobObject | ZwCreateJobObject<br>ZwOpenJobObject |
| Mailslot | CreateMailslot | ZwCreateMailslotFile |
| Pipe | CreateNamedPipe<br>CreateFile | ZwCreateNamedPipeFile<br>ZwCreateFile |
| Timer | CreateWaitableTimer<br>OpenWaitableTimer | ZwCreateTimer<br>ZwOpenTimer |

The proxy hook 310 is arranged to generate a proxy resource access request as shown by the arrow at step 502. This request message suitably includes the name of the desired resource 115. The request message at step 502 may further identify the user process 120 that is trying to open the desired resource. The request message at step 502 may further identify the desired access (i.e. the type of access which is desired such as read or write). The request message at step 502 may further identify any other relevant parameters that would ordinarily be passed to the API call. These other parameters may depend particularly upon the type of the resource.

A proxy service 320 is arranged to receive the proxy resource access request message at step 502 from the proxy hook 310. The proxy hook 310 and the proxy service 320 communicate by any suitable form of inter-process communication (IPC). The proxy service 320 executes in a privileged security context 111. As an example, the proxy service 320 may run in the privileged security context 111 of the SYSTEM account. Typically, this privileged security context 111 gives unrestricted access to local resources. Further, the privileges of the SYSTEM account also enable the proxy service 320 to impersonate the security context of a logged on user or a local administrator, if this is necessary to access specific resources.

The proxy service 320 is arranged to validate the proxy resource access request message at step 502 from the proxy hook 310 as represented by the arrow at step 503. The validation may take any suitable form. In the example embodiments, the proxy service 320 validates the request against a plurality of policies 330. The validation may include checking a file name of the user process 120, the owner of the process 120 (i.e. the user), or other suitable criteria. The policy 330 provides a configurable mechanism to determine whether or not the requested access will be permitted or denied. The policies 330 suitably identify the resources 115, 125 which are to be permitted, or respectively denied, access by the user process 120. The resources 115, 125 can be identified within the policies 330 by providing a name of the resource. In an example embodiment, non-exact matching is also permitted within the policies 330, such as by wild card matching against resource names. In the example embodiment, the proxy service 320 suitably identifies whether or not a predetermined policy 330 exists with reference to this request, i.e. identifying the relevant user process 120 and the desired resource 115.

Where the proxy service 320 validates the request at step 503, the proxy service 320 will then obtain a resource handle from the security unit 250 that permits access to the desired resource 115. In the example embodiment, the proxy service 320 executing in the privileged security context 111 is permitted by the security unit 250 to obtain access to the desired resource 115. As a result, the security unit 250 returns the resource handle which permits access to the desired resource 115. In one example embodiment, the proxy service 320 comprises a proxy open resource function which requests access to the desired resource 115 through the security unit 250 as represented by arrow at step 504. Suitably, the proxy service resource access request at step 504 from the proxy service 320 to the security unit 250 defines a most restricted access right (following least-access principles), when considering the access as requested in the request message at step 502 passed from the proxy hook 310 and the access as permitted by the policies 330 with respect to the desired resource 115.

Assuming that the API call by the proxy service 320 at step 504 is successful, then a handle to that object (a resource handle) is returned by the security unit 250 at step 505. The resource handle is returned by the proxy service 320 to the proxy hook 310 at step 506. The proxy hook 310 returns the resource handle to the user process 120 at step 507. Subsequently, the user process 120 is able to access the desired resource 115 using the resource handle that has been obtained through this proxy resource access mechanism.

In one example embodiment, the proxy service 320 duplicates the resource handle 505 into the context of the user process 120. Suitably, the proxy service 320 duplicates the resource handle obtained from the security unit 250 into the address space of the user process 120.

Where the proxy service 320 at step 503 does not validate the original request message as sent at step 502 from the proxy hook 310, then the proxy service 320 suitably returns an error message to the proxy hook 310 at step 506. For example, if there is no match within the policies 330 for the user process 120 and/or for the desired resource 115, then an appropriate error code is suitably returned to the proxy hook 310. As another example, if there is match within the policies 330 for the user process 120 and/or for the desired resource 115, but the match indicates that the requested access should be denied, then an appropriate error code is suitably returned to the proxy hook 310.

In one example, the proxy service 320 is arranged to send the reply at step 506 immediately when the request message at step 502 cannot be validated with respect to the policies 330 at step 503. In this situation, the proxy service 320 does not attempt to make a request to the security unit 250 at step 504.

Where the proxy service 320 at step 504 does not obtain a handle to the desired resource, then the proxy service 320 suitably returns an error message to the proxy hook 310 at step 506. For example, if the security unit 250 denies access to the desired resource 115 (such as by returning a NULL handle at step 505), then an appropriate error code is suitably returned to the proxy hook 310 at step 506.

In the example embodiments, the proxy hook 310 at step 508 is arranged to selectively pass through the system call made by the user process 120. For example, if the proxy service 320 returned an error code indicating that no policy was set, that the request is denied, or that the proxy service was unable to obtain a handle, then it may be prudent to allow the user process 120 to continue with the original request for that desired resource 115. In the example embodiments, this pass-through is a failsafe procedure which allows the user process 120 to request access to the desired resource from its own security context 121. The system call is then made to the security unit 250 and a reply is received at step 510, which may be an error code denying access to the resource or a handle provided directly from the security unit 250. Here, the reply is returned via the proxy hook 310 at step 511 and provided to the user process at step 507.

In another example embodiment, the proxy hook 310 is arranged, as a primary path, to pass through the system call made by the user process 120 to the OS as at step 508 and, if that system call fails, the proxy hook will then initiate the proxy resource access request as at steps 502 et seq as a secondary path.

As noted in Table 1, in the example embodiments the WIN32 API functions will call their native API counterparts. Here the native API provides the interface between the user mode 220 and the kernel mode 230 within the operating system 202 as noted above. Therefore, in the example embodiments, the proxy hook 310 may be implemented by intercepting the Win32 API or the native API functions. For example, a file can be created or opened through the Win32 API via the CreateFile function or through the native API via the ZwCreateFile and ZwOpenFile functions.

In one example embodiment, the proxy resource access unit 300 is provided in conjunction with the privilege management module 110 as discussed above. Thus, the privilege management module 110 is able to selectively apply an alternate set of access rights specifically to the particular user process 120 of interest. Meanwhile as discussed below, the proxy resource access unit 300 controls access by that user process 120 to specific resources 115, 125. Hence, the example computer device provides powerful yet flexible mechanisms to control access to resources by the user process.

Figure 7:
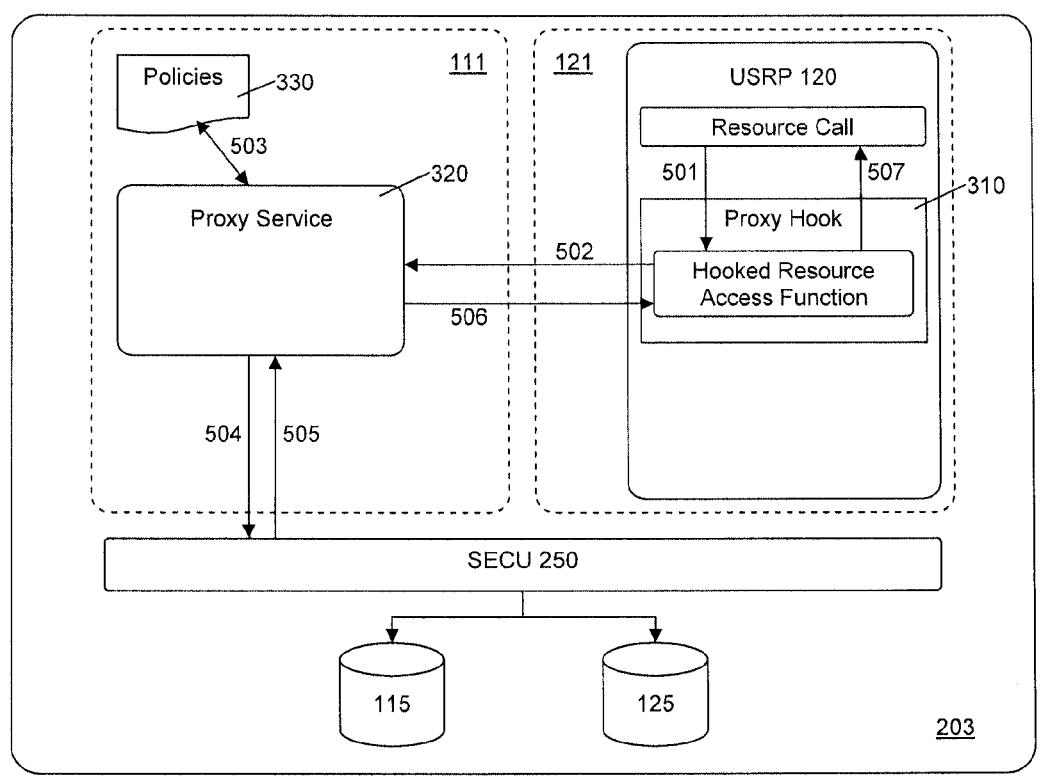
FIG. 7 is a schematic diagram showing the example computer device in more detail concerning a resource access management mechanism and a method of accessing resources in the computer device.

FIG. 7 is a schematic diagram showing the example computer device in more detail concerning the example proxy resource access unit and resource access control method.

In the example implementation of FIG. 7, some of the resources 115, 125 may be associated with a resource handle which is not capable of being duplicated from one process context into another process context, i.e. which cannot be duplicated into the address space of a user process 120 by the proxy service 320. For example, opening Systems Services returns a SC_HANDLE which cannot be duplicated. In this situation, the proxy hook 310 is suitably arranged to intercept all of the system calls relevant to manipulating the relevant resource 115.

Initially, the proxy services 320 will open the System Service on behalf of the proxy hook 310 (and thus on behalf of the user process 120) and will return a system resource handle (SC_HANDLE) that the proxy service 320 has opened with the security unit 250. Suitably, the steps 501-507, and optionally steps 508-511, are performed as noted above. However, in this example embodiment, the proxy hook 310 maintains a table of system resource handles (a table of SC_HANDLEs) that have been opened by the proxy service 320 on its behalf. Whenever a System Service operation is performed on one of these system resource handles, the proxy hook 310 then proxies the relevant system call (API call) to the proxy service 320. The proxy service 320 then performs the requested operation on behalf of the proxy hook 310 and returns the results in a corresponding return message. In this example, the proxy service 320 not only requests access to the relevant resource on behalf of the user process 120 but further accesses and manipulates the resource 115 on behalf of the user process 120. In the example embodiment, the System Services would require the system calls as shown in Table 2 below to be intercepted and proxied.

TABLE 2

OpenService
ChangeServiceConfig
ChangeServiceConfig2
ControlService
ControlServiceEx
DeleteService
EnumDependentServices
NotifyServiceStatusChange
QueryServiceConfig
QueryServiceConfig2
QueryServiceObjectSecurity
QueryServiceStatusEx
SetServiceObjectSecurity
StartService
CloseServiceHandle It will be appreciated that the proxy resource access mechanism as described herein has many advantages. The proxy resource access method and apparatus provides exceptions to the resource access control which would otherwise be enforced by the security unit 250. Hence, the proxy resource access mechanism may define exceptional elevation, or exceptional degradation, of the access rights of the user process 120 with respect to the desired resource 115. In the example embodiments, these exceptions provide a finely granulated level of control.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed herein, such functional elements may be combined into fewer elements or separated into additional elements.

In summary, the example embodiments have described an improved mechanism to control access to a resource within a computer device. The industrial application of the example embodiments will be clear from the discussion herein.

Although a few preferred embodiments have been shown and described, it will be appreciated by those skilled in the art that various changes and modifications might be made without departing from the scope of the invention, as defined in the appended claims. Therefore, the present embodiments are to be considered in all respects as illustrative and not restrictive, and all changes coming within the meaning and equivalency range of the appended claims are intended to be embraced therein.

What is claimed is:
1. A method, implemented by a processor of a computing device, of
controlling access to a resource in the computer device, the method comprising:
executing processes in an execution environment of the computer device supported by an operating system of the computer device, wherein the processes include a user process which executes according to a user security context set by the operating system and which defines a first set of access privileges of the user process;

making a system call to the operating system of the computer device by the user process to request access to a particular resource, the particular resource being amongst a plurality of resources which are available in the execution environment of the computer device, and wherein access to the plurality of resources is controlled by the operating system, and wherein the first set of access privileges of the user process do not permit access to the particular resource;

intercepting the system call made by the user process to request access to the particular resource, the intercepting being performed by a proxy hook function embedded within the user process;

generating a proxy resource access request, the proxy resource access request being generated by the proxy hook function embedded within the user process in response to the intercepting the system call by the proxy hook function embedded within the user process;

sending the proxy resource access request from the proxy hook function embedded within the user process to a proxy service function executing in a privileged security context in the execution environment of the computer device, wherein the privileged security context of the proxy service function has a second set of access privileges which are different from the first set of access privileges of the user security context of the user process, and wherein the second set of access privileges of the proxy service function permit access to the particular resource;

validating the proxy resource access request by the proxy service function and, if validated, obtaining, by the proxy service function, a resource handle, having an associated level of access, issued by an object manager of the operating system that permits access to the particular resource according to the level of access;

returning the resource handle issued by the object manager of the operating system from the proxy service function to the user process via the proxy hook function embedded in the user process;

and accepting a request from the user process by the object manager to access the particular resource wherein when the request includes a name of the particular resource and not the resource handle, accessing the particular resource using the name if additional security checks are performed successfully and wherein when the request includes the resource handle of the particular resource and not the name of the particular resource, and if the request does not require access which exceeds the level of access, accessing the particular resource using the resource handle without performing the additional security checks.

2. The method of claim 1, further comprising validating the proxy resource access request against a policy list comprising a plurality of predetermined policies which define access to one or more of the plurality of resources available in the execution environment of the computer device and controlled by the operating system.

3. The method of claim 2, further comprising:
declaring a desired access level by the user process in the system call, selected from amongst at least create, read and write access levels with respect to the particular resource;
recording the desired access level in the proxy resource access request; and
determining whether to allow or deny access to the particular resource by comparing the desired access level against one or more access levels recorded in the plurality of predetermined policies of the policy list.

4. The method of claim 1, further comprising:
duplicating the resource handle obtained by the proxy service function to provide a duplicate handle;
returning the duplicate handle to the user process; and
accessing the resource by the user process using the duplicate handle.

5. The method of claim 1, further comprising:
returning an error code from the proxy service function to the proxy hook function when the proxy resource access request is not permitted by the proxy service function;
passing the system call from the user process to the operating system of the computer device, in response to receiving the error code at the proxy hook function; and
processing the system call at the operating system of the computer device according to the user security context.

6. The method of claim 1, further comprising:
making a further system call by the user process to operate the particular resource;
intercepting by the proxy hook function the further system call made by the user process to operate the particular resource; and
operating the particular resource by the proxy service function on behalf of the user process.

7. A computer device, comprising:
a processor and a memory which in use operate to provide:
an execution environment supported by an operating system of the computer device, and configured to execute processes, wherein the processes include a user process that is executed by the processor according to a user security context set by the operating system and which defines a first set of access privileges of the user process;
the operating system configured to selectively control access by the user process to a plurality of resources available in the execution environment according to the user security context, wherein the user process is configured to request access to a particular resource of the plurality of resources by making a system call to the operating system, and wherein the first set of access privileges of the user process do not permit access to the particular resource; a proxy resource access function comprising:
a proxy hook function embedded within the user process, wherein the proxy hook function is configured to intercept the system call made by the user process to the operating system to request access to the particular resource and to generate a proxy resource access request in response thereto;
and a proxy service function configured to execute in a privileged security context different from the user security context of the user process, wherein the proxy service function is configured to validate the proxy resource access request from the proxy hook function and, if validated, to obtain from an object manager of the operating system a resource handle that permits access to the particular resource and to return the resource handle issued by the object manager to the user process via the proxy hook function thereby permitting access by the user process to the particular resource using the resource handle as issued by the object manager wherein the object manager accepts a request from the user process having a level of access to access the particular resource wherein when the request includes a name of the particular resource and not the resource handle, the user process accesses the particular resource using the name if additional security checks are performed successfully and wherein when the request includes the resource handle of the particular resource and not the name of the particular resource, and if the request does not require access which exceeds the level of access, accessing the particular resource by the user process using the resource handle without performing the additional security checks.

8. The computer device of claim 7, wherein the proxy resource access function is configured to selectively control access by the user process to the plurality of resources available in the execution environment as exceptions to the access control by the operating system.

9. The computer device of claim 7, wherein the proxy resource access function is configured to selectively enable access by the user process to the particular resource whereas access to the particular resource otherwise would not be permitted by the operating system.

10. The computer device of claim 7, wherein the proxy resource access function is configured to selectively deny access by the user process to the particular resource whereas access to the particular resource otherwise would be permitted by the operating system.

11. The computer device of claim 7, wherein the proxy service function is configured to validate the proxy resource access request from the proxy hook function against a policy list comprising a plurality of predetermined policies which define access to one or more of the plurality of resources available in the execution environment by the user process.

12. The computer device of claim 11, wherein the user process is configured to declare a desired access level in the system call, wherein the desired access levels include create, read and/or write access with respect to the particular resource, wherein the proxy hook function is configured to record the desired access level in the proxy resource access request, and wherein the proxy service function is configured to allow, or deny, access to the particular resource by comparing the desired access level against one or more access levels recorded in the predetermined policies of the policy list.

13. The computer device of claim 11, wherein the proxy resource access request comprises an identity of the user process and the proxy service function allows or denies access to the particular resource including comparing the identity of the user process against one or more user process identities recorded in the predetermined policies.

14. The computer device of claim 7, wherein the proxy service function is configured to obtain the resource handle which permits access to the particular resource, and is configured to duplicate the resource handle as a duplicate handle to be used by the user process to access the particular resource.

15. The computer device of claim 7, wherein the proxy service function is configured to return an error code to the proxy hook function where the proxy resource access request is not permitted and, upon receiving the error code, the proxy hook function is configured to pass the system call from the user process to a security circuit to be processed according to the user security context.

16. The computer device of claim 7, wherein the proxy hook function is further configured to intercept the system call made by the user process to operate the particular resource particular resource, and the proxy service function is configured to operate the resource on behalf of the user process.

17. The computer device of claim 16, wherein the proxy hook function is configured to maintain a record of one or more of system resource handles issued by the object manager of the operating system that have been opened by the proxy service function on behalf of the proxy hook function with respect to the resource which is provided as a system service, and the proxy hook function is configured to selectively intercept system calls made by the user process to request an operation of the system service, and wherein a proxy service circuit is configured to perform the requested operation on behalf of the proxy hook function and to returns a result in a corresponding return message.

18. The computer device of claim 7, wherein the proxy hook function is provided as a dynamic linked library component which hooks into the user process when the user process is started.

19. The computer device of claim 7, wherein the user process is configured to make the system call though an application programming interface.

20. A tangible, non-transitory computer readable medium having recorded thereon instructions which, when implemented by a computer device, cause the computer device to perform the steps of:

executing processes in an execution environment of the computer device supported by an operating system of the computer device, wherein the processes include a user process which executes according to a user security context set by the operating system and which defines a first set of access privileges of the user process;

making a system call to the operating system of the computer device by the user process to request access to a particular resource, the particular resource being amongst a plurality of resources which are available in the execution environment of the computer device, and wherein access to the plurality of resources is controlled by the operating system, and wherein the first set of access privileges of the user process do not permit access to the particular resource;

intercepting the system call made by the user process to request access to the particular resource, the intercepting being performed by a proxy hook function embedded within the user process;

generating a proxy resource access request, the proxy resource access request being generated by the proxy hook function embedded within the user process in response to the intercepting the system call by the proxy hook function embedded within the user process;

sending the proxy resource access request from the proxy hook function embedded within the user process to a proxy service function executing in a privileged security context in the execution environment of the computer device, wherein the privileged security context of the proxy service function has a second set of access privileges which are different from the first set of access privileges of the user security context of the user process, and wherein the second set of access privileges of the proxy service function permit access to the particular resource;

validating the proxy resource access request by the proxy service function and, if validated, obtaining, by the proxy service function, a resource handle, having an associated level of access, issued by an object manager of the operating system that permits access to the particular resource according to the level of access;

returning the resource handle issued by the object manager of the operating system from the proxy service function to the user process via the proxy hook function embedded in the user process; and accepting a request from the user process by the object manager to access the particular resource wherein when the request includes a name of the particular resource and not the resource handle, accessing the particular resource using the name if additional security checks are performed successfully and wherein when the request includes the resource handle of the particular resource and not the name of the particular resource, and if the request does not require access which exceeds the level of access, accessing the particular resource using the resource handle without performing the additional security checks.

* * * * *